March 7, 1950 G. SMITH 2,499,979
OPERATING MECHANISM FOR THE
LANDING DOORS FOR ELEVATORS
Filed Sept. 13, 1948 8 Sheets-Sheet 2

*Inventor*

George Smith

By *Clarence A. O'Brien and Harvey B. Jacobson*
*Attorneys*

March 7, 1950

G. SMITH 2,499,979

OPERATING MECHANISM FOR THE
LANDING DOORS FOR ELEVATORS

Filed Sept. 13, 1948

Inventor
George Smith

By Clarence A. O'Brien
and Harvey B. Jacobson
Attorneys

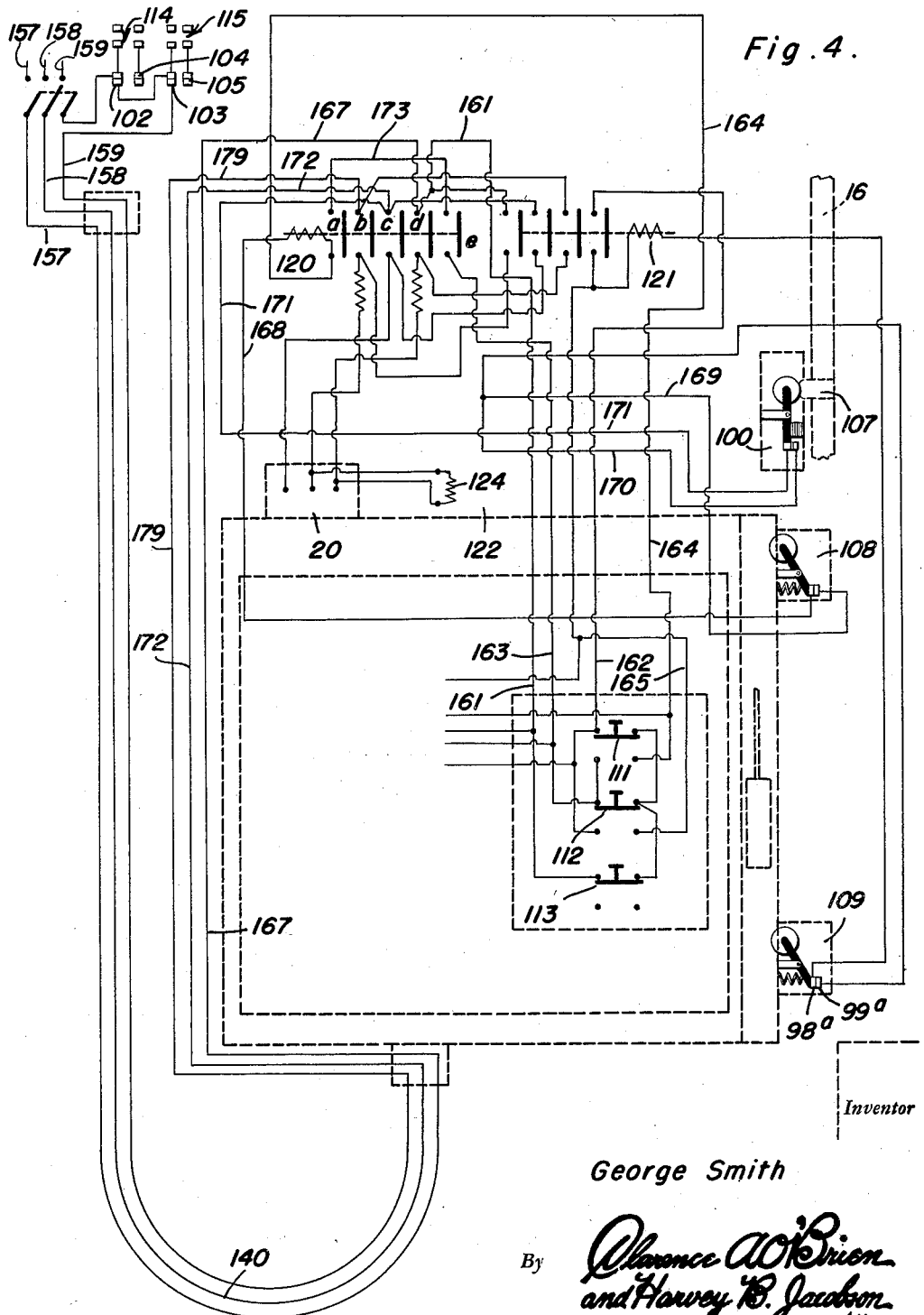

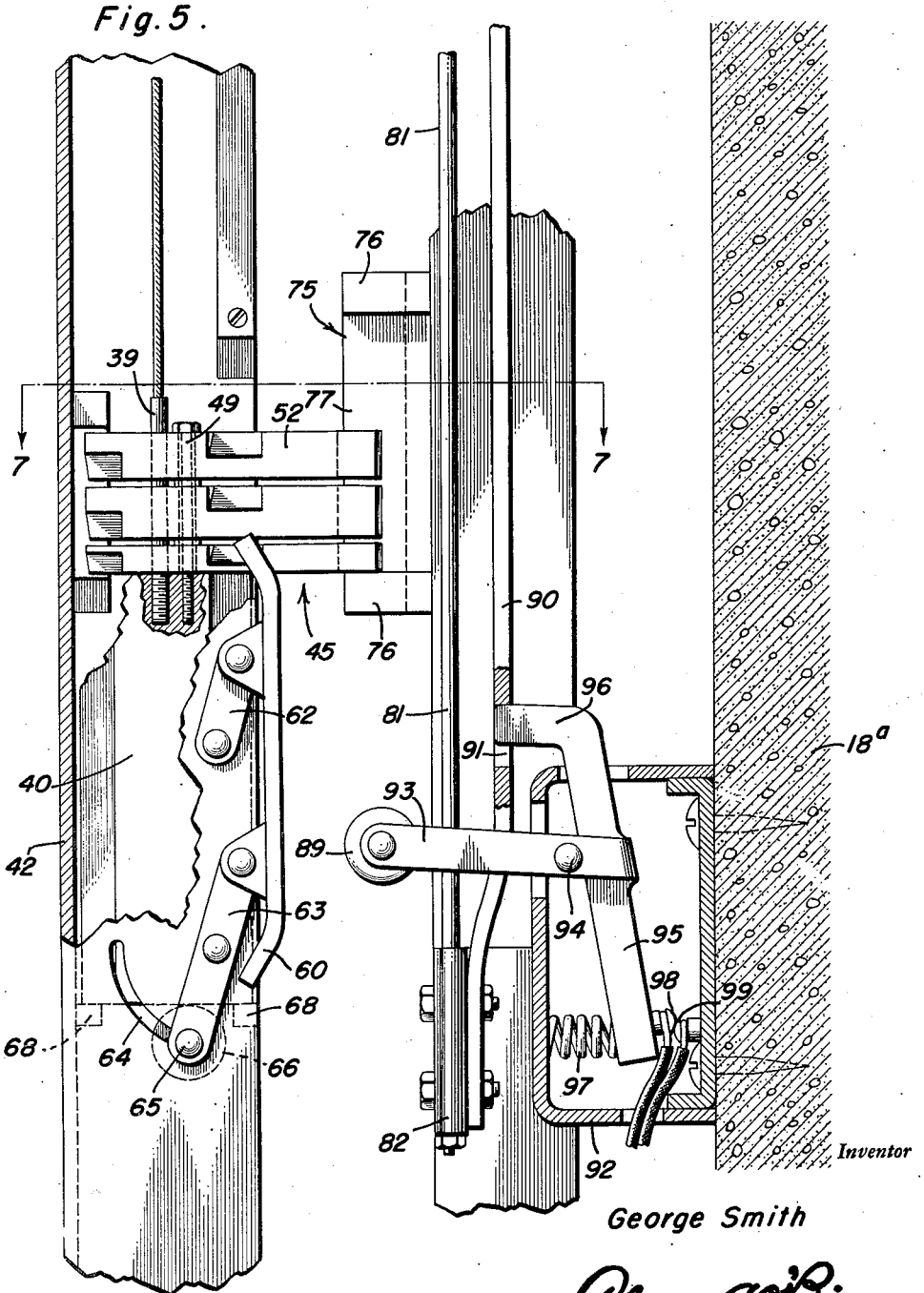

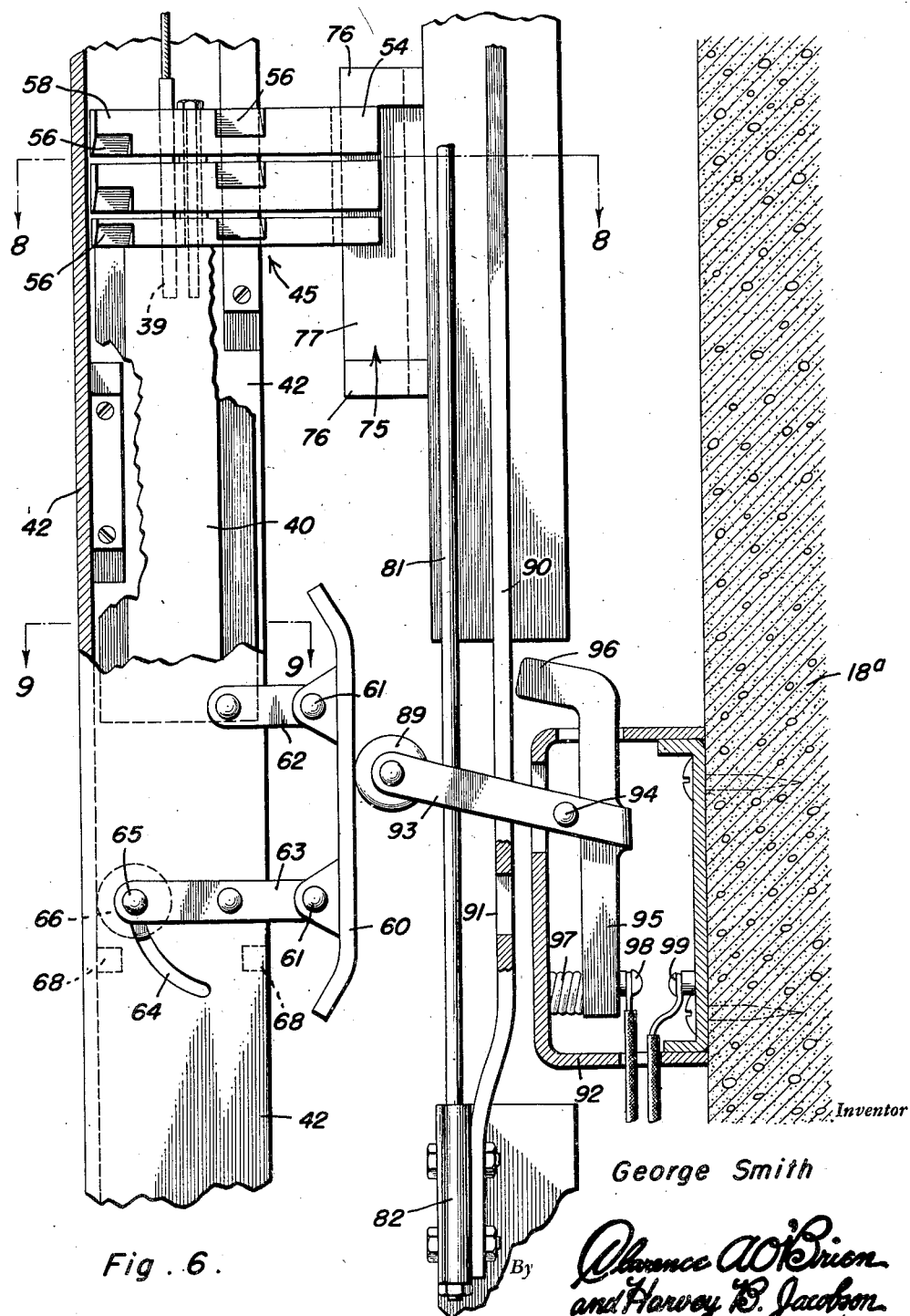

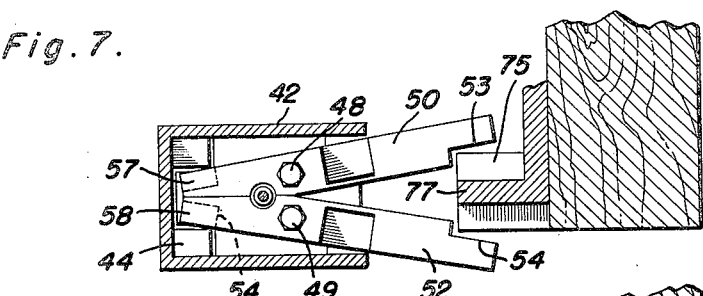
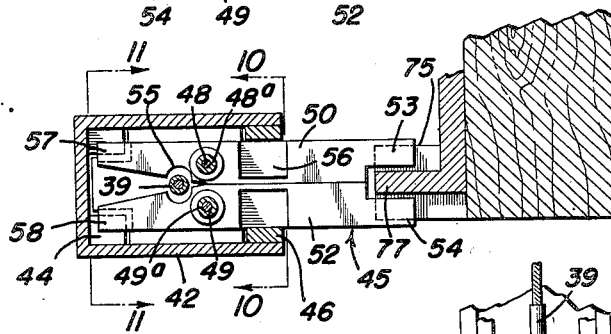
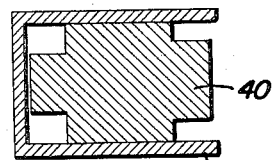
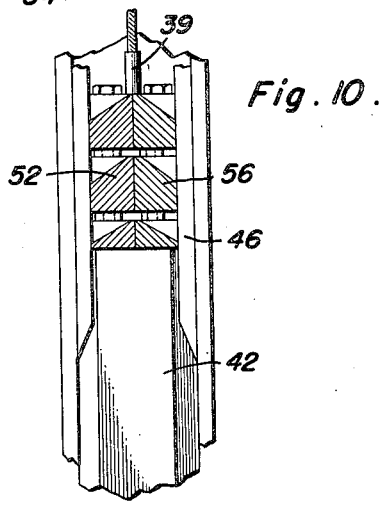
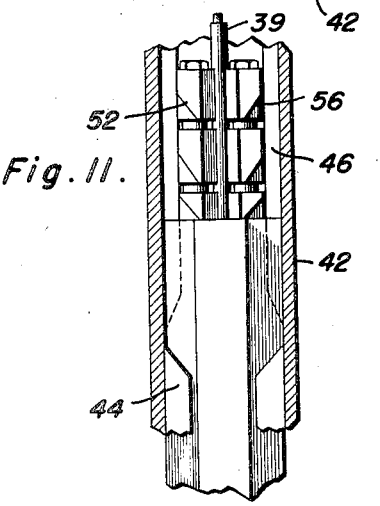

March 7, 1950

G. SMITH 2,499,979

OPERATING MECHANISM FOR THE
LANDING DOORS FOR ELEVATORS

Filed Sept. 13, 1948

Inventor

George Smith

By *Clarence A. O'Brien
and Harvey B. Jacobson*
Attorneys

Patented Mar. 7, 1950

2,499,979

UNITED STATES PATENT OFFICE 2,499,979

OPERATING MECHANISM FOR THE
LANDING DOORS FOR ELEVATORS

George Smith, Honolulu, Territory of Hawaii

Application September 13, 1948, Serial No. 49,088

8 Claims. (Cl. 187—52)

This invention relates to the operating mechanisms of the landing doors of elevators and it has for its principal object to provide a simple and effective mechanism for operating said doors mechanically by means exclusively or almost exclusively located in or on the elevator car.

Freight elevators are customarily provided with vertically movable landing doors consisting either of a single panel or of two sections parting in the middle. This makes it practically impossible to move the landing doors in any non-mechanical manner and means have therefore to be provided for moving said doors, the actuation of which must be controlled by the elevator car itself and which are preferably set into operation by the operator of the car. Such means have been proposed and actually used, and they comprise, as a rule, a number of electric motors arranged on the landing. A separate motor is in many cases associated with each door panel which has to move in a vertical direction and a further motor operates the locking device, holding the door sections when closed, and other controls. If these motors are to be controlled from the elevator car by a controller or by buttons arranged in the interior of the car means for establishing a contact between the moving and the stationary portions of the circuits have to be provided and moreover the speed is limited by the characteristics of the electric motors used. As the mechanism used has to be provided on each landing the costs of installation and of maintenance are directly in proportion to the number of landings.

A primary object of the invention therefore consists in providing an operating mechanism which is much simplified and which requires only a minimum of installation at the landings, while at the same time providing for a higher speed of operation.

According to the invention, therefore, the operating mechanism is almost completely arranged on the elevator car, the landing door being merely provided with gripping means which may be seized by a gripping device on the elevator car which has stopped on the landing, and with a simple locking device actuated by means carried by the elevator car. The overall simplification therefore is marked, as especially those parts which have to be arranged in multiple are reduced in number and simplified in structure. The invention allows however also a larger degree of safety, as its association with the car provides automatically or by the addition of very simple means for a locking which renders it impossible to move the doors unless an elevator car has been stopped in the proper loading position in front of the doors. Moving the doors of a landing from a passing car is rendered impossible even without the special safety arrangement sometimes provided to eliminate this possibility.

It is therefore an object of the invention to provide means which are movable on the car and which may be mechanically coupled with the doors in order to move the door panels in a vertical direction, said means being controlled by the operator on one hand and by automatic means stopping further motion when the predetermined limits have been reached on the other hand.

It is a further object of the invention to associate the coupling and uncoupling of the movable device provided on the car with the door panel to be moved directly and automatically with the upward and downward travel of the said device.

It is a further object of the invention to provide driving means which accelerate and decelerate at a high rate and which while stopping and starting smoothly permit a high degree of speed.

It is a further object of the invention to provide a stationary locking device for the doors on each landing which may be operated mechanically by a mechanism on the car which in its turn is associated with the lifting or lowering movement, so that the doors are automatically unlocked when the mechanism is in the proper position for lifting and is automatically locked when the car leaves its position whatever the position of the lifting mechanism on the car.

It is a further object of the invention to energize the control means of the operator arranged on the elevator car only when the car is in proper loading position in front of a landing.

It is a further object of the invention to provide additional safety by associating the energizing circuit for the motor of the door lifting and lowering mechanism with the switches operated and closed when the elevator car is moving in such a way that such energization of the above mentioned driving means can only take place when the car is not moving and the switches are open.

Further and more specific objects of the invention are mentioned or will appear in the following detailed specification.

One embodiment of the invention is illustrated in the drawings but it is to be understood that this embodiment is an example illustrating the principle on which the invention is based and the best mode of applying this principle. The principle of the invention has been fully explained so that persons skilled in the art will be able to apply it under different circumstances in a modified form and modifications of the embodiment shown are therefore not necessarily departures from the essence of the invention.

Figure 1:
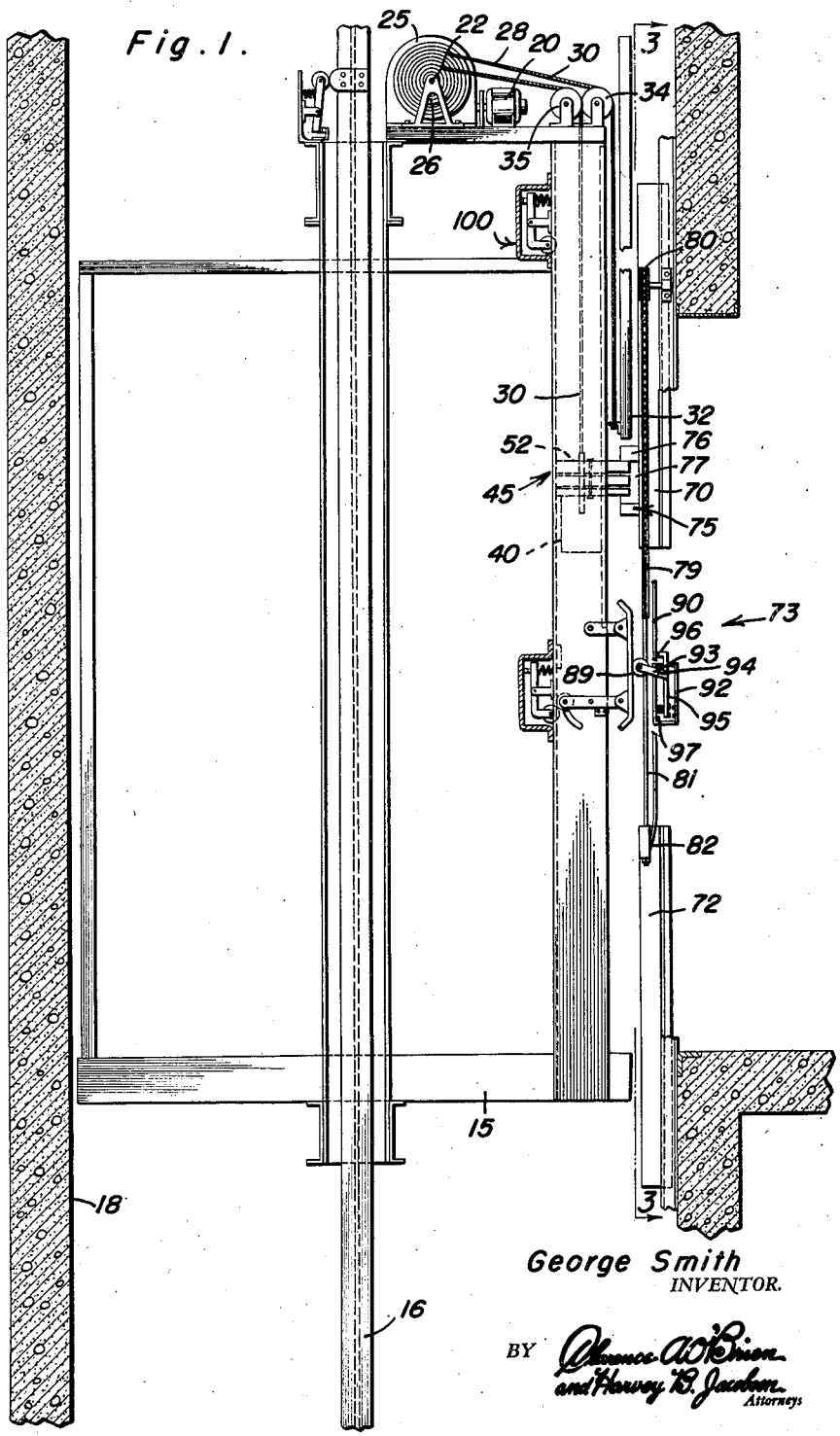
Figure 1 is an elevational partly sectional view of the shaft, showing a side view of the car and the landing doors, with the shaft down in longitudinal section.
Figure 2:
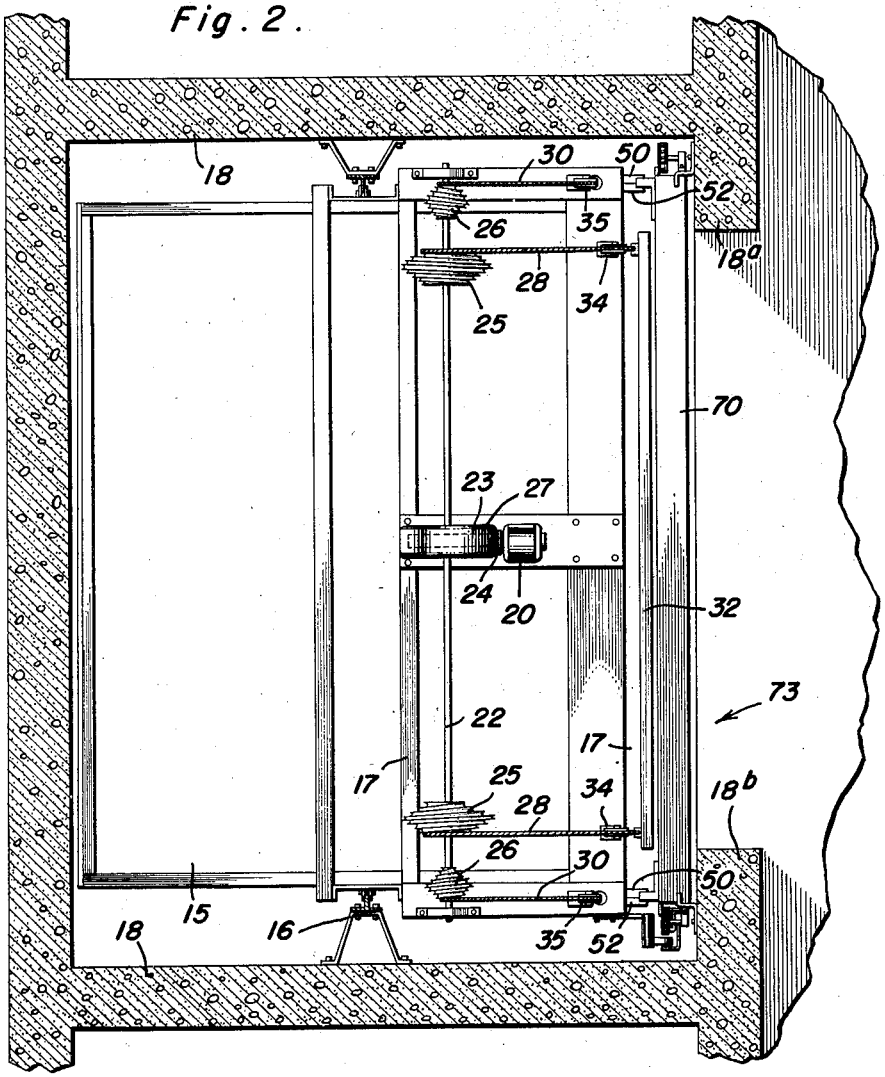
Figure 2 is a sectional plan view, showing the elevator car and the landing doors in a top view.
Figure 3:
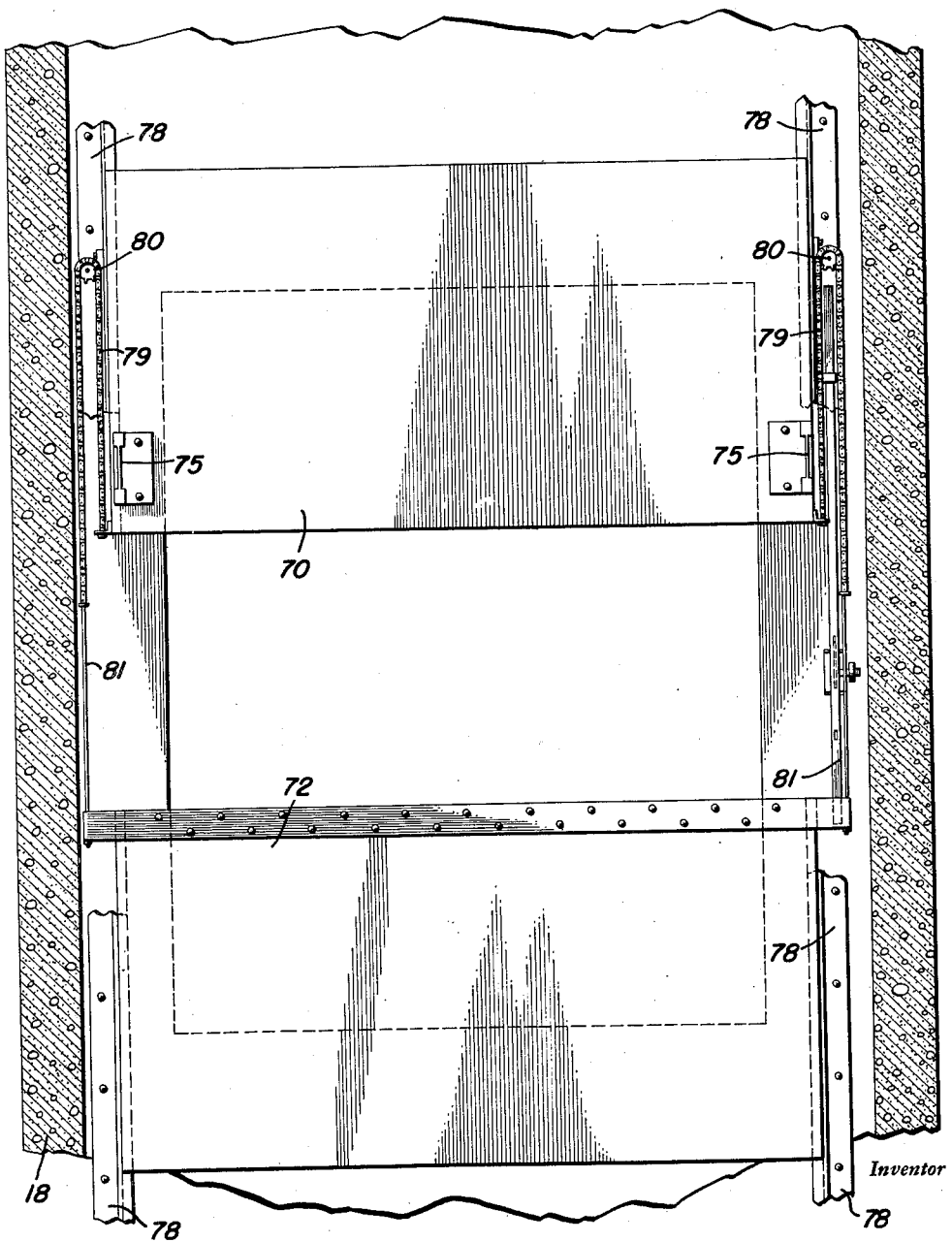

Figure 3 is an elevational sectional front view of the shaft showing the two landing doors in front view in half open position. This figure illustrates the mechanism by means of which the two doors are connected. The section is taken along line 3—3 of Figure 1.

Figure 4 is a diagram of the electrical connections.

Figures 5 and 6 are partly sectional elevational side views of the gripping mechanism and of the weight operated control mechanism on an enlarged scale in positions corresponding to different operational phases.

Figures 7 and 8 are sectional plan views of the gripping mechanism in positions corresponding to different operational phases, the sections being taken along lines 7—7 and 8—8 of Figures 5 and 6 respectively.

Figure 9 is a sectional plan view through part of the mechanism on the car, the section being taken along line 9—9 of Figure 6.

Figure 10 and Figure 11 are two sectional elevational views of the gripping device, the sections being taken along lines 10—10 and 11—11 of Figure 8.

Figure 12:
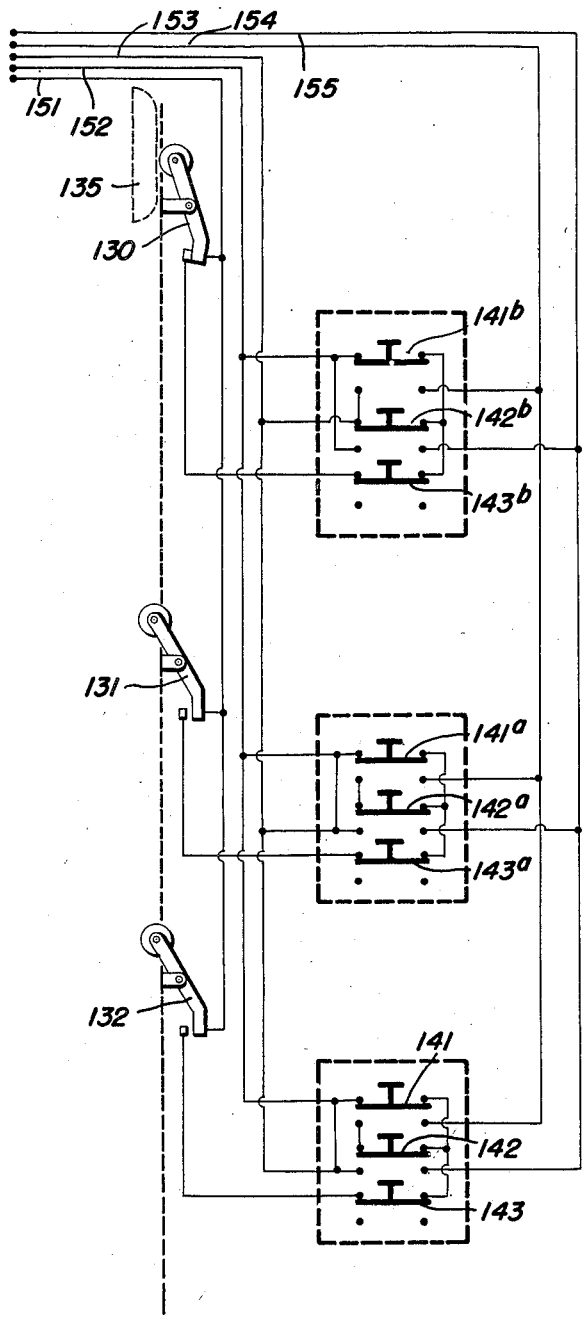

Figure 12 is a diagram of the electrical connections on the landing floor, which permit opening and closing of the doors.

As above explained the mechanism which forms the subject matter of the invention is part of a freight elevator or of any other type of elevator in which the elevator car is merely provided with a gate while the landings are provided either with a door having two parting sections (normally located one above the other and parting in the middle) or with a door consisting of a single panel only which is operated by the operator standing in the car and manipulating a set of push buttons, a controller lever or the like.

The operating mechanism for the gate and for the landing doors is mounted on the car and the invention aims at providing a mechanism of the greatest simplicity which eliminates the machine or operating mechanism for each door section and the mechanism for operating the locking mechanism of the doors on the landing, each of which requires a separate motor, to be controlled by the control mechanism in the car. As there are numerous landings a plurality of mechanisms in each landing increases the complication and the costs of the installation and those of the maintenance. Moreover the speed with which the doors and gates can operate is slow and the noise due to the permanent operation of many motors on the landing is disagreeable and excessive.

The invention eliminates the above named disadvantages and provides an improved, fast working, silent and much simplified equipment. According to the invention the elevator car 15 travelling between the guide rails 16 of the shaft 18 carries on its top channel irons 17 on which the driving mechanism for the gate and landing doors is mounted. This mechanism includes an electric motor 20 driving a shaft 22 by means of a suitable gear 23, such as a worm gear, which shaft may also carry a brake 27. On said shaft two pairs of cable drums 25, 26 are mounted over which run the cables 28, 30 for the gates and for the door operating mechanism. The drums are preferably of the tapered and scored type with spiral grooves which permit a very smooth and slow starting and stopping of the load moved by the cable while the load after starting may be rapidly accelerated so as to travel at relatively high speed. The slow speed at the limits of the travel suppresses shocks or bouncing and eliminates noise.

The gate 32 of the elevator car moves, as a rule, at a higher speed than the doors but the drums 25 for the gate hoist cables 28 may be mounted on the same shaft on which the drums for the doors are mounted. Their diameter in this case has to be proportionately larger.

The hoist cables 28, 30 run over the rollers 34, 35 mounted on the channels on top of the elevator car and then are attached to suitable lugs projecting from the gates 32, and to an actuating weight 40 respectively. The gate operating mechanism is identical with the mechanism now in general use and need not be further described.

The members of the door operating mechanism which are mounted on the elevator car include, in addition to the cable 30, drum 26, and roller 35, the actuating weight 40 fixed to the cable by means of a threaded bolt 39 which carries a gripping device generally indicated at 45. This weight runs within a box or channel 42, open toward the landing and is of suitable cross section as shown in Figure 9. This cross section leaves sufficient space for cam or guide strips arranged in the corners of said box or channel and projecting inwardly. Two such cam or guide strips 44 are near the closed end of the box or channel, and two further cam or guide strips 46 are arranged near the open end at places and for a purpose to be described below.

The actuating weight 40 carries two threaded pivot bolts 48, 49 threaded into suitable bores and projecting upwardly. These bolts serve as pivots for two sets of pairs of gripping members 50, 52 adapted to grip one of the door sections or panels on the landing as will be described below. A plurality of pairs of gripping members is preferable, but it is obvious that from a purely mechanical standpoint a single pair of grippers would be sufficient.

Each gripping member is provided with a bore 48a, 49a through which the pivot bolt passes. The grippers belonging to one pair have jaws 53, 54 cooperating with each other and adapted to be moved towards and away from each other. These jaws project outwardly through the open end of box 42, while the rear projections 57, 58 of the grippers 50, 52 are located within the box 42. The grippers may be provided with inclines 56 at their rear ends and near those portions which are near the open box. These inclines may facilitate cooperation with the cam or guide strips.

It will be clear from the above that when the weight 40 moves up and down within the box the grippers move through the box with the weight, and the cam or guide strips 44, located at certain places of the box, cause closing and opening of the jaws 53 and 54 and hold them in their closed and open positions.

The grippers may be provided with a semicircular cut 55 in order to allow the bolt 39 on cable 30 to pass between them even when closed.

Below the actuating weight a movable cam plate 60 is arranged on the outside of the box which may be pivoted at 61 to two parallel guide arms 62, 63 which are themselves pivoted to the wall of the box 42. One of these arms 63 carries a roller 66 on an axle 65 projecting into the interior of the box through a slot 64 in the wall. The cam plate is weighted or is of sufficient weight to keep the roller 66 in a raised position at the upper end of the slot; moreover, as will be seen from Figure 6 the cam plate 60 itself when in this position projects outwardly to a larger extent than is the case when the cam plate is raised.

Such raising of the cam plate 60 takes place when the weight 40 is lowered and reaches its lowermost position in which it may rest on the two stops 58 provided within the gripping box. In this position the roller 66 has been engaged and has been moved downwardly so that it occupies its lowermost position at the lower end of the slot 64. This movement causes a raising of the plate 60 accompanied by a retraction of the same towards the gripping box.

The landing door on each landing is formed by two parting door sections 70, 72 always moving in opposite directions in front of the shaft opening 73 on each landing, giving access to the shaft and elevator car, which opening is framed by the two flanking wall sections 18a and 18b. The gripping mechanism and the switches are preferably arranged in the shaft behind said wall section so that they are out of reach and not visible. Preferably only the upper section 70 of the door is moved directly by the aforedescribed mechanism carried by the car. Manifestly therefore also a door with a single panel may be operated in the same way.

This upper door section 70 is provided with a grip bar 75 on each side, which cooperates with the gripping members on the two sides of the elevator car.

The grip bar 75 has two prismatic end pieces 76 of considerable width in the direction facing the shaft joined by an offset or reentrant web like portion 77 of small width in the direction facing the shaft. This web like portion joining the two protruding heads is gripped by the gripping members 50, 52 when the weight 40 is moved. Gripping by means of said members obviously depends on the cam or guiding strips 44, 46 in the box. When guiding strips 44 are active the jaws 53, 54 of the gripping members 50, 52 are opened so that they may pass the heads 76 of the grip bar 75 when moved. When the gripping members travel through a portion of the box containing the cam or guide strips 46, they are closed as shown in Figure 8 so that their jaws 53, 54 are closing in on the web 77. It is not necessary that the web be actually firmly gripped. The closed gripping members will meet the lower side of the heads 76 when they are lifted and will therefore move the grip bar 75 and the door 70 to which it is attached without such direct gripping action on the web.

The two door sections slide in a frame 78 mounted on the walls of the shaft and are connected by a chain 79 running over a sprocket wheel 80 mounted on a pin fixed in said frame. The chain may be attached to the upper door section 70 near its lower edge on one side and to a rod 81 on the other side, which rod is fastened in a sleeve 82 fixed near the upper edge of the lower door section. It will therefore be obvious that every downward movement of the upper door section will entail an upward movement of the lower section until the two sections meet in the middle of the opening closed by the door. Likewise an upward movement of the upper section is accompanied by a downward movement of the lower section until the upper section has moved up to the desired extent and has cleared the upper half of the opening, while the lower section moves downwardly and clears the lower half of the opening. The two doors, as will be readily perceived, are balancing each other by means of the chain, sprocket wheel and rod.

Attached to the lower door in the example shown is a locker plate 90 provided with a suitable lock opening 91. Behind the locker plate a box 92 is fixedly carried by the shaft wall sections 18a and 18b which contains a locker arm 93 pivoted on a pin 94 carried by the said box. The locker arm 93 projects towards the shaft in which the car moves and carries a roller 89 which is adapted to engage cam plate 60 when the latter projects outwardly. The locker arm carries on its other end a lock bar 95 with a bent head 96 protruding toward the locker plate which may enter into the lock opening 91. The said locker arm is under the influence of a spring 97 which urges it towards the locker plate 90 and which therefore tends to keep the head 96 of the lock bar 95 within the lock opening 91 thus preventing the doors from being moved and holding them in their locked position. The unlocking of the door is only possible when the cam plate 60 is in its lower position in which it projects outwardly thereby pressing against the roller 89 and bringing arm 93 into a position in which the spring 97 is compressed and lock bar 95 is withdrawn from the locker plate.

This, as will be clear, can only occur if a car is in front of the landing in the proper position for unloading or loading and when the operator starts the operation of the door mechanism.

The lock bar 95 may also carry a contact 98, cooperating with a fixed contact 99 mounted in the box and pressed against it when the door is locked by means of the lock bar. These switch contacts may thus be used as one of the safety switches, as explained below.

The mechanism is electrically controlled by means of switches. The electric control of the car travel in general does not differ materially from the electric control in other cases and will therefore not be described. The door control is preferably supervised by a switch 100. Switch 100 is operated by a cam plate 107 fixed on the guide rails of the car in such a position that switch 100 can only be closed when the floor of the car is at landing floor level.

Two other switches 108, 109 used in connection with the arrangement above described are limit switches which are arranged close to the limits of the travel of the actuating weight 40 and are directly or indirectly operated by said weight. The lower limit switch 109 may be formed by the switch on lock bar 95 and may consist of contacts 98, 99. A similar switch 108, provided with a roller carrying a lever projecting into the path of the weight 40, is arranged near the upper end of the path of the weight 40 and is operated by the same when the upper position of the gripping members is reached. These switches control the circuits of the so-called open and closed direction switches 120, 121 in the switch box 122 of the car.

The car, in addition to the controller or push button set controlling the upward and downward movement of the car (not shown) has a push button set 111, 112, 113 for controlling the movement of the landing doors. Button 111 controls the opening of the door. Button 112 controls the closing of the door while button 113 permits to arrest the door in any position which it may have reached in the event of an accident.

The control box in addition merely contains the customary overload relays, a brake coil for applying the brake to the drums or drum shafts when the electromotor is switched off and other appliances associated with the movement of the elevator car. In addition, so-called directional switches of the car movement may be provided, having additional contacts 102, 103, 104, 105, as shown in the diagram, which are closed when the directional switches which are diagrammatically indicated at 114, 115 are opened and closed when the said directional switches are open. The switches 114 and 115 close when the car is moving upwardly or downwardly. They are however opened, closing contacts 102, 103, when the car comes to a standstill in front of a landing.

The contacts 102, 103 may be inserted into one of the phase conductors of the power supply for the electromotor driving the drum shafts for the actuating weight so that door operation may only take place when those directional switches of the car are open, a condition which will only be fulfilled when the car is not travelling between landings, but is at a standstill in front of a landing.

On each landing floor a set of buttons 141, 142, 143; 141a, 142a, 143a; 141b, 142b, 143b, as shown in Figure 12, is provided, the buttons 141, 141a, 141b being adapted to operate the circuits closing the door, while buttons 142, 142a, 142b operate circuits opening the door. The push buttons 143, 143a, 143b when operated, arrest the door in any position in which it may be when the said push button is operated.

The push buttons cooperate with the three switches 130, 131, 132. Switch 130 is operated by a cam 135 attached to the car and is closed when the car reaches a landing in which position the cam depresses the switch lever. The two other switches 131 and 132 are limit switches, either operated by the door or by a member moving with the door, such as the weight on the car for example.

The conductors 151 to 155 leading from the push button sets are connected with the corresponding conductors 161 to 165 leading from the push button sets in the car. The connection is made by contact pieces, not shown, establishing connection when the car is in front of landing.

The operation will be readily understood from the foregoing description. The mechanical operation of the door mechanism has already been described in detail. The circuit connection is the following:

When the car reaches a landing floor and therefore comes to a stop, cam 107 closes switch 100 and likewise cam 135 closes the switch 130 on the landing on which the car came to a stop. Moreover, the directional switches 114 and 115 are opened when the car comes to a stop whereby contacts 102 and 103 of the switches are closed and complete the circuit through phase conductor 159 which forms part of the power supply line consisting of the three conductors 157, 158, 159.

The doors may now be operated either from the push button set within the car 111, 112, 113 or from the sets on the landing which the car has reached.

Let it be assumed, for instance, that the door is operated from the interior of the car; the operator then presses the button 111 shortly to open the door. A circuit through the coil 120 of the "open" directional switch is thereby closed which runs from phase conductor 157 through the cable 140 suspended from the car, to conductors 167 and 161 and through closed push buttons 113 and 112 to the lower contacts of push button 111, now closed temporarily by the pressing of said button, and through conductor 164, coil 120, conductor 168, contacts of switch 108, conductor 169, conductor 170, contacts of switch 100, conductors 171, and 172, and through cable 140 to phase conductor 158.

Upon energization of coil 120 a holding circuit is closed which includes closed push button 112, conductor 163, armature e of the "open" directional switch coil 120, conductor 173 and armature a closing the circuit of coil 120 in a manner which is independent of the circuit through button 111. The push button 111 may therefore be released after it has been pressed down shortly.

Armatures b, c, d of switch 120 connect the phase conductors 167, 172 and 179 with motor 20 and with brake coil 124. The brake is thereby released and the electric motor is energized. The electric motor drives shaft 22 and turns the drums 25, 26 lifting the gate and moving the door panels in the manner already described.

When the door is lifted, the limit switch 109 which is operated when the door is closed is now opened. The lifting of the door continues and shortly before the actuating weight reaches the highest point the switch 108 is opened and the circuit of the coil 120 is thereby interrupted. The opening of the circuit stops the electromotor 20 and de-energizes the brake coil 124 whereupon the brakes will be applied.

The same operation occurs when one of the push buttons 141, 141a, 141b is pressed provided the car is in front of a landing; the conductors 151, 152, 153 are in this case connected with the conductors 161, 162, 163 so that the pressing of one of the buttons may cause an operation which is identical with the one just described.

The closing of the door is obtained by pressing push button 112 (or push button 142, 142a, 142b) continuously until this operation is completed.

The pressing of button 112 energizes the "closed" directional switch coil 121, over phase conductor 157, cable 140, conductors 167, 161, closed push button 113, closed push button 111, lower contacts of push button 112, conductor 165, coil 121, contacts 98a and 99a of limit switch 109, conductor 170, contacts of switch 100, conductors 171, 172, to phase conductor 158. The armature of coil 121 now energizes the electromotor 20 in the reverse direction. The door therefore starts to close and moves downwardly as long as button 112 is pressed when the actuating weight passes the limit switch 109 it opens its contacts and therefore opens the circuit of closing coil 121 thus stopping the electric motor 20 and de-energizing the brake coil 124 whereby the brakes are again applied.

It is to be understood that the above described mechanism may be modified in many respects and that changes of an unessential character will not affect the essence of the invention.

Having described the invention, what is claimed as new is:

1. An operating mechanism for vertically movable landing doors of elevators, comprising an elevator car, hoisting drums mounted on the elevator car, controlled driving means for the same, hoist cables adapted to be wound and unwound on said drums, a load member at the end of said hoist cables, a gripping device attached to said load member, including movable gripping members, guiding members for said gripping members on said car, adapted to move said gripping members into and out of their gripping position, a vertically movable landing door, a grip bar on said door, adapted to be gripped by the gripping device moved with the hoist cable, a locking member adapted to lock the movable door, a locking lever attached to said locking member projecting towards the car, and a movable cam plate on said elevator car, moved into and out of operative contact with said locking lever by the load device.

2. An operating mechanism for vertically movable landing doors of elevators, comprising an elevator car, hoisting drums mounted on the elevator car, controlled driving means for the same, hoist cables adapted to be wound and unwound on said drums, a weight suspended on said hoist cables, gripping devices with gripping arms pivotally carried by said weight, an open box, guiding the weight with the gripping devices, said gripping arms projecting outwardly from said box, guide strips along said box for guiding the gripping movement of the gripping devices during the movement of the weight, a vertically movable landing door, a grip bar on said door, adapted to be gripped by the gripping device moved with the hoist cable, and a locking member for the landing door operated by said weight.

3. An operating mechanism for vertically movable landing doors of elevators, comprising an elevator car, guide rails for the same, hoisting drums on said elevator cars, hoisting cables wound and unwound by said drums, an electric motor for driving the drums, an energizing circuit for the same, hand control means in said elevator car for closing the energizing motor circuit manually, limit switches for interrupting said circuit at the end of the door opening and closing movement respectively, a load member at the end of the cables, said member operating said limit switches, a gripping device attached to said load member, including movable gripping members, guiding members for said gripping members on said car, adapted to move said gripping members into and out of their gripping position, a vertically movable landing door, a grip bar on said door, adapted to be gripped by the gripping device moved with the hoist cable, and a locking member for said door operated by said load member.

4. An operating mechanism for vertically movable doors as claimed in claim 3, comprising an automatic switch attached to the elevator car controlling the manually controlled energizing circuit of the motor, said switch being provided with an operating arm, and a cam attached to the guide rail of the elevator car closing said switch at a landing, so as to exclude energizing of the motor by manual controls between landings.

5. An operating mechanism for vertically movable doors as claimed in claim 3 wherein one of the limit switches is connected with the door locking member operated by the load member.

6. An operating mechanism for vertically movable doors as claimed in claim 3, wherein said elevator car is provided with means controlling the upward and downward travel of the car and including direction switches, control contact means inserted into the energizing circuit of the motor during the hoisting drums, said contacts being associated with the direction switches and being closed when the direction switches are open, so as to prevent opening of the door during the upward or downward movement of the elevator car.

7. An operating mechanism for vertically movable landing door comprising an elevator car, hoisting drums with spirally arranged grooves, mounted on the elevator cars, hoist cables running in said grooves and wound up and unwound at a different rate of speed during the rotation of the drums, controlled driving means for the said drums, a load member at the end of said hoist cables, a gripping device attached to said load member, including movable gripping members, guiding members for said gripping members on said car, adapted to move said gripping members into and out of their gripping position, a vertically movable landing door, a grip bar on said door, adapted to be gripped by the gripping device moved with the hoist cable, and a locking member for said door operated by said load member.

8. An operating mechanism for vertically movable landing door of operators comprising an elevator car, a movable gate on said car, a shaft in said car, pairs of hoisting drums of different diameter with spirally arranged grooves mounted on said shaft on the elevator car, hoist cables running in the grooves of one pair of drums, attached to said gate further hoist cables running in said groove and wound and unwound at a different rate of speed during rotation and at a rate of speed differing from that of the first named cables, a load member attached to each of said further hoist cables, controlled driving means for said shafts, a gripping device attached to said load member, including movable gripping members, guiding members for said gripping members on said car, adapted to move said gripping members into and out of their gripping position, a vertically movable landing door, a grip bar on said door, adapted to be gripped by the gripping device moved with the hoist cable.

GEORGE SMITH.

REFERENCES CITED

The following references are of record in the file of this patent:

UNITED STATES PATENTS

| Number | Name | Date |
| --- | --- | --- |
| 1,961,188 | Allen et al. | June 5, 1934 |